United States Patent [19]

Yoshimura et al.

[11] Patent Number: 4,985,973
[45] Date of Patent: Jan. 22, 1991

[54] MANUFACTURING METHOD FOR DIAPHRAGM SPRING

[75] Inventors: Yoshinari Yoshimura; Ikuo Murata, both of Neyagawa, Japan

[73] Assignee: Kabushiki Kaisha Daikin Seisakusho, Osaka, Japan

[21] Appl. No.: 393,908

[22] PCT Filed: Dec. 14, 1988

[86] PCT No.: PCT/JP88/01270
§ 371 Date: Jul. 26, 1989
§ 102(e) Date: Jul. 26, 1989

[87] PCT Pub. No.: WO89/05699
PCT Pub. Date: Jun. 29, 1989

[30] Foreign Application Priority Data

Dec. 17, 1987 [JP] Japan .................. 62-319697

[51] Int. Cl.$^5$ ............................ B23P 13/00
[52] U.S. Cl. .................... 29/173; 192/89 B; 267/161
[58] Field of Search .................. 29/173; 192/89 B; 72/335, 379; 267/161, 162, 164, 158

[56] References Cited

U.S. PATENT DOCUMENTS

| 3,327,739 | 3/1966 | Pritchard | 267/161 |
| 4,503,696 | 3/1985 | Roeder | 72/379 |
| 4,571,800 | 2/1986 | Faupell | 72/379 |
| 4,655,333 | 4/1987 | Martinez-Corral | 192/89 B |
| 4,704,041 | 11/1987 | Hayashi et al. | 267/161 |

FOREIGN PATENT DOCUMENTS

| 2735861 | 2/1978 | Fed. Rep. of Germany | 29/173 |
| 3427162 | 1/1988 | Fed. Rep. of Germany | |
| 53-21352 | 2/1978 | Japan | |
| 57-1687 | 1/1982 | Japan | |
| 61-59025 | 3/1986 | Japan | |

Primary Examiner—P. W. Echols
Attorney, Agent, or Firm—Armstrong, Nikaido, Marmelstein, Kubovcik, & Murray

[57] ABSTRACT

A manufacturing method for a disk-like diaphragm spring for making a center hole at a center part, making rectangular holes on an outer peripheral part with specified spaces left between such holes in a circumferential direction, forming plural ligulated fingers radially by means of plural radial slits extending from such rectangular holes to the center hole and inner peripheral parts of the fingers to be pressed by a release bearing. The method comprises a step of punching such rectangular holes and slits out of a disc-like blank with a press and forming between the slits tapered ligulated fingers and a process of punching out a center hole by using a gear-shaped press die having circular tip portions at the same spacing as the slits for forming tapered openings at the slits extending radially outward from the center hole slits and circular ends on the fingers.

6 Claims, 3 Drawing Sheets

MANUFACTURING METHOD FOR DIAPHRAGM SPRING

TECHNICAL FIELD

This invention relates to a manufacturing method for a diaphragm spring for use in a clutch for a vehicle etc.

BACKGROUND ART

Conventionally, when manufacturing a diaphragm spring for use in a clutch cover assembly; plural holes 32 and slits 33 have been punched out from a disc-like metal blank 31 by a first press work as illustrated by FIG. 6, and then a circular center hole 34 has been punched out as shown in FIG. 7 by a second press work. Thereafter the blank has been bent to a specified shape as illustrated by FIG. 8. This diaphragm spring is elastically deformed by being pushed and pulled by a release bearing 36 at inner peripheral parts of fingers 35 formed of the slits 33 to cause a clutch disc to be pressed on and separated from a flywheel through, for instance, a pressure plate.

In the conventional manufacturing method, it has been impossible to make a width of the slit 33 smaller than the plate thickness of the blank 31. Furthermore, contact area between an inner peripheral part of the finger 35 and a release bearing 36 is small because of the reduced inner peripheral width of the finger 35 causing a high bearing pressure. With the high bearing pressure the inner peripheral part of finger 35 has worn out quickly.

DISCLOSURE OF THE INVENTION

In order to solve the foregoing problem, this invention provides a manufacturing method for a diaphragm spring in which, when making a center hole at a central part, making plural rectangular holes on an outer peripheral part with specified spaces left therebetween in a circumferential direction, forming plural ligulated fingers radially by means of plural radial slits extending from the rectangular holes to the center hole, and manufacturing the disc-like diaphragm spring wherein inner peripheral parts of these fingers are pressed by a release bearing; two processes are involved: a first process for punching the peripheral holes and slits out of a disc-like blank by a press work and a second process for punching out the center hole by using a gear-shaped press die having circular tip portions spaced at the same spacing as that of the slits. A blank inner peripheral side end of each slit, opposite, is formed into a tapered shape in punching out the rectangular holes and slits. An angular position of the circular tip portion of the press die is aligned with that of the tip ends of the tapered shape of the slits in the process for punching out the center hole.

According to the above-mentioned method, the blank inner peripheral side end of each slit along the longitudinal sides thereof, is formed into the tapered shape in the punching process for punching out the rectangular holes and slits. The position of the circular tip portion of the press die is aligned with that of the tip ends of the tapered shape of the slits in the process for punching out the center hole. Therefore, the inner peripheral part of the finger formed between the slits has a large width so that the bearing pressure can be reduced because of the large contact area with the release bearing. Thus, the wear is reduced and the durability improved in the manufactured diaphragm spring.

BRIEF DESCRIPTION OF THE DRAWINGS

FIG. 6, and FIG. 7 and FIG. 8 are explanatory views for a manufacturing method for a conventional diaphragm spring.

BEST MODE FOR CARRYING OUT THE INVENTION

Figure 1:
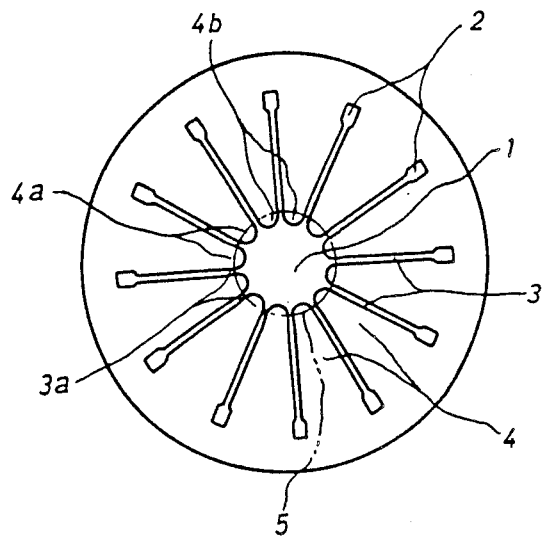
FIG. 1 is a front view of a diaphragm spring obtained by the manufacturing method in an embodiment of the present invention.

In FIG. 1 which is the front view of the diaphragm spring formed by the manufacturing method in the embodiment of the present invention, a center hole 1 is made at a central part of a disc-like diaphragm spring, and plural rectangular holes 2 are made at an outer peripheral part thereof with specified spaces left therebetween on the same circumference. Slits 3 extending from the rectangular holes 2 to the center hole 1 are formed in radial directions. The inner peripheral side, i.e. the center hole 1 side end portion 3a, along longitudinal opposite sides of each slit 3, is formed into a tapered shape. Plural fingers 4 are, thus, radially formed by plural slits 3. An inner peripheral part, i.e. a free end portion of each finger 4, is composed of a club-shaped expanded portion 4a formed by the tapered end portion 3a of the slit 3 and a circular arc portion 4b protruding integrally from the expanded portion 4a and having a circular tip end. The free end portions of these fingers 4 are pressed by a release bearing 5.

Figure 2:
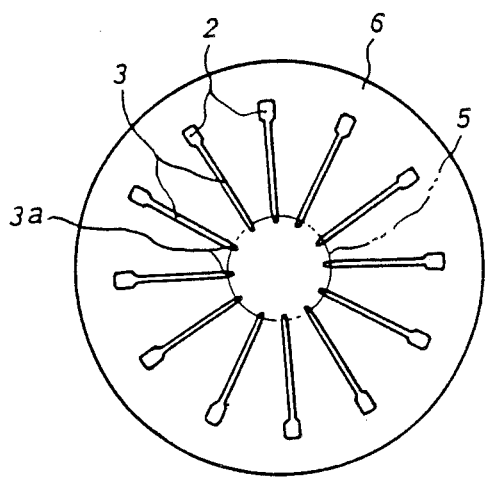
FIG. 2 through FIG. 5 are explanatory views for a manufacturing method of a diaphragm spring of the present invention.
Figure 3:
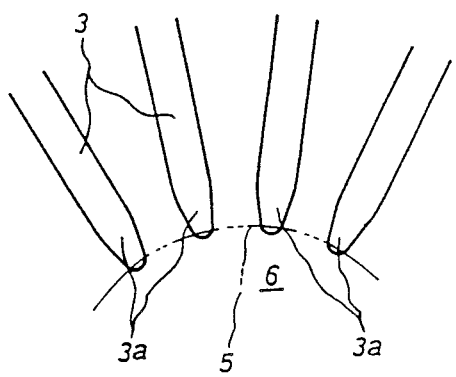
Figure 4:
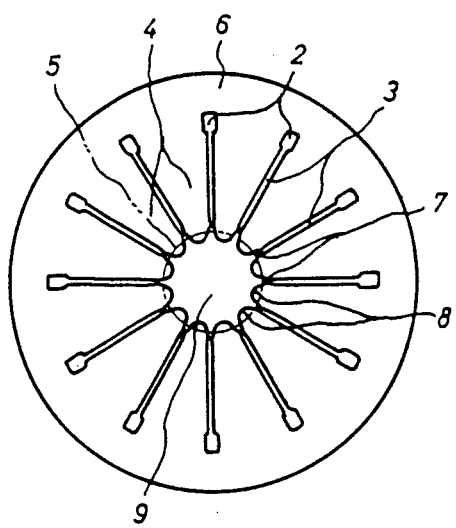
Figure 5:
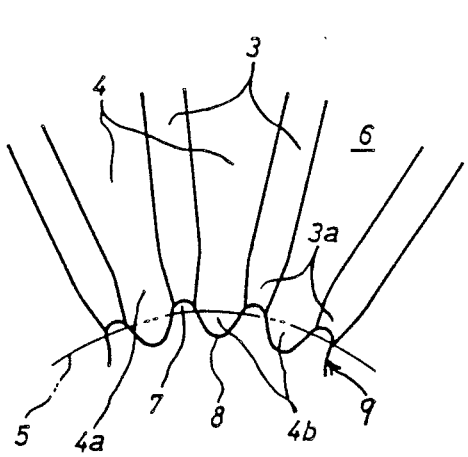
Figure 6:
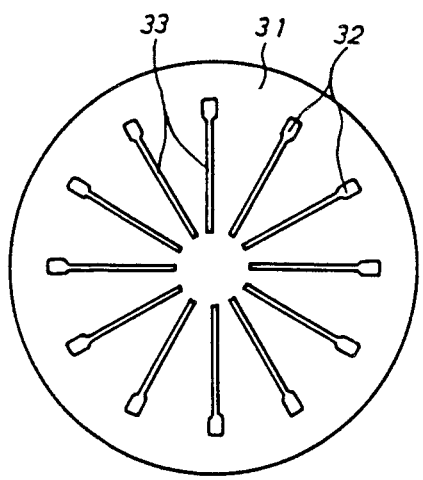
Figure 7:
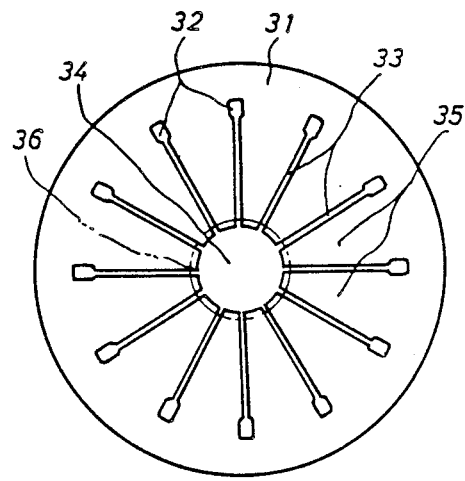

In FIG. 2 through FIG. 5 which are the explanatory views for the manufacturing method for the diaphragm spring in the embodiment of the invention, show that, when manufacturing the diaphragm spring, all the rectangular holes 2 and the slits 3 are punched out of a disc-like metal blank 6, simultaneously, by a first press work as illustrated by FIG. 2. In this instance, the end portion 3a of each slit 3 is formed into a tapered-shape as far as press dies permit and further is cut to a position slightly inside of a circumference at which an outer peripheral edge of the release bearing 5 contacts with the diaphragm spring, as illustrated by FIG. 3. In the second press work stage, after straightening the blank 6 which has been deformed by the press work, the center hole 1 is punched out by using a gear-shaped press die 9 having circular tip portions 7 and bottom portions 8 of the same width and spacing as that of the slit 3, as illustrated by FIG. 4. In this instance, a boundary between the tip portions 7 and the bottom portions 8 of the press die 9 is aligned with a line on which the outer peripheral edge of the release bearing 5 contacts the diaphragm spring, as illustrated by FIG. 5. After straightening the blank 6 from which the center hole 1, the rectangular holes 2 and the slits 3 have already been punched out, the blank is shaped to a specified shape so that a disc-like diaphragm spring similar to that shown in FIG. 8 is obtained.

In the diaphragm spring thus manufactured, the end portion 3a of the slit 3 is formed into the tapered shape and the center hole 1 is punched out by the gear-shaped press die 9 having the tip portions 7 and the bottom portions 8, so that the free end portion of each finger 4 is composed of the expanded portion 4a and the circular arc portion 4b. Accordingly, the width of contacting surface between the free end portion of the finger 4 and the release bearing 5 becomes larger and the bearing pressure becomes small because of the large contact area, so that wear is reduced to improve durability. Further, according to the manufacturing method as described in this embodiment, the above-mentioned excellent diaphragm spring can be manufactured by only changing the shape of the press die 9 without increasing the number of processes as compared with the conventional method and without requiring a new manufacturing facility.

The foregoing embodiment is explained with reference to the example wherein the center hole 1 is punched out after punching out the rectangular holes 2 and the slits 3. However, this invention is not limited to such a structure. The rectangular holes 2 and the slits 3 may be punched out after punching out the center hole 1.

Moreover, the foregoing embodiment is explained with reference to the example wherein the rectangular holes 2 are punched out simultaneously with the slits 3. However, this invention is not limited to such a method, but the oval holes 2 may be punched out separately from the slits 3.

Furthermore, the foregoing embodiment is explained with reference to the example wherein the bottom portion 8 of the press die 9 is formed into the circular arc shape. However, this invention is not limited to such a structure, but the bottom portion 8 may be formed into any other arbitrary shape.

As described above, the present invention provides the process for punching the entire rectangular holes 2 and slits 3 out of the disc-like blank 6 by press work and the process for punching out the center hole 1 by using the gear-shaped press die 9 having circular tip portions 7 of the same quantity as that of said slits 3. In the preferred embodiment the blank 6 inner peripheral side end of each slit 3 is formed into the tapered shape in the process for punching out the rectangular holes 2 and slits 3, and the angular position of the circular tip portion of the press die 9 is aligned with the tapered shape of said slit 3 in the process for punching out the center hole 1. Therefore, a diaphragm spring can be obtained such that the width of the contacting surface with the release bearing 5 is large and the bearing pressure is small because of the large contact area so as to provide less wear and excellent durability. Further, such diaphragm spring can be manufactured by only changing the shape of the press die 9 without increasing the number of processes, as compared with the conventional method, and without requiring new facility.

INDUSTRIAL APPLICABILITY

As described above, the present invention is effectively applicable to the manufacture of the diaphragm spring for use in the vehicle clutch etc.

What is claimed is:

1. A two step method for manufacturing a diaphragm spring, having a circular center hole at a center of a disc-like blank, plural rectangular holes on an outer peripheral part of said disc-like blank with specified spaces left therebetween in a circumferential direction, plural ligulated fingers extending radially inwardly between radial slits, said slits each extending inwardly from one of said holes to said circular center hole, wherein inner peripheral parts of said fingers are pressed by a release bearing; comprising a step of punching said rectangular holes and said slits out of said disc-like blank with a press work and a step of punching out said center hole with a gear-shaped press die having circular tip portions of the same width and spacing as that of said slits for forming circular tip end portions at tapered inner ends of said ligulated fingers.

2. A manufacturing method for a diaphragm spring as set forth in claim 1, in which said step of punching out said center hole is carried out after said step of punching out said rectangular holes and said slits.

3. A manufacturing method for diaphragm spring as set forth in claim 1, in which said step of punching out said rectangular holes and said slits is carried out after punching out said center hole.

4. A manufacturing method for a diaphragm spring as set forth in claim 1, in which said rectangular holes are punched out simultaneously with said slits.

5. A manufacturing method for a diaphragm spring as set forth in claim 1, in which said rectangular holes are punched out separately from said slits.

6. A manufacturing method for a diaphragm spring as set forth in claim 1, in which a gear-shaped press die having circular arc bottom portions is used in said step of punching out said center hole.

* * * * *